United States Patent [19]

Houpt et al.

[11] Patent Number: 4,863,226
[45] Date of Patent: Sep. 5, 1989

[54] CONFOCAL LASER SCANNING MICROSCOPE

[75] Inventors: Pieter M. Houpt, The Hague; Arie Draaijer, Zwijndrecht, both of Netherlands

[73] Assignee: Nederlandse Organisatie Voor Toegepas - Natuurwetenschappelijk Onderzoek Tno, The Hague, Netherlands

[21] Appl. No.: 166,226

[22] Filed: Mar. 10, 1988

[30] Foreign Application Priority Data

Mar. 13, 1987 [NL] Netherlands ............... 8700612

[51] Int. Cl.[4] ........................................ G02B 26/10
[52] U.S. Cl. ................................. 350/6.5; 350/6.91; 250/566; 250/310
[58] Field of Search ............... 350/6.5, 6.6, 6.9, 6.91, 350/6.1, 400, 401, 403, 404, 500, 510, 6.8, 516, 520, 529; 250/566, 572, 310; 346/108, 109

[56] References Cited

U.S. PATENT DOCUMENTS

| | | | |
|---|---|---|---|
| 4,044,363 | 8/1977 | Morgan | 350/6.91 |
| 4,634,880 | 1/1987 | Lindow et al. | |
| 4,640,626 | 2/1987 | Schmid et al. | 250/310 |
| 4,727,381 | 2/1988 | Bille et al. | 346/108 |

FOREIGN PATENT DOCUMENTS

2152697 8/1985 United Kingdom .

OTHER PUBLICATIONS

J. G. De La Rosa et al., "Wafer Inspection With a Laser Scanning Microscope", *AT&T Technical Journal*, vol. 65, No. 1, Jan./Feb. 1986, pp. 68-77, Short Hills, New Jersey, US.

*Primary Examiner*—Bruce Y. Arnold
*Assistant Examiner*—Loha Ben
*Attorney, Agent, or Firm*—Brumbaugh, Graves, Donohue & Raymond

[57] ABSTRACT

Confocal laser scanning microscope comprising a laser as point light source, a deflection system for the line and frame scanning and a lens system, at least one objective near the object, an object stage, a spatial filter and a detector, and an electronic control and imaging-processing system. The object is scanned point by point by the light beam and measurement is made with the detector only where the point light source is focused so that out-of-focus light is not detected. As a result resolution and contrast in three dimensions, in particular, axially to the image plane can be improved considerably, and 3D information can be derived from the object. For the more rapid line scanning, the deflection system of the present invention comprises an acousto-optical deflector and comprises for the slower frame scanning, another deflector constructed in a manner such that at least the frame-scanning movement of the return light beam is completely eliminated, as a result of which the return light is focused on the spatial filter.

14 Claims, 2 Drawing Sheets

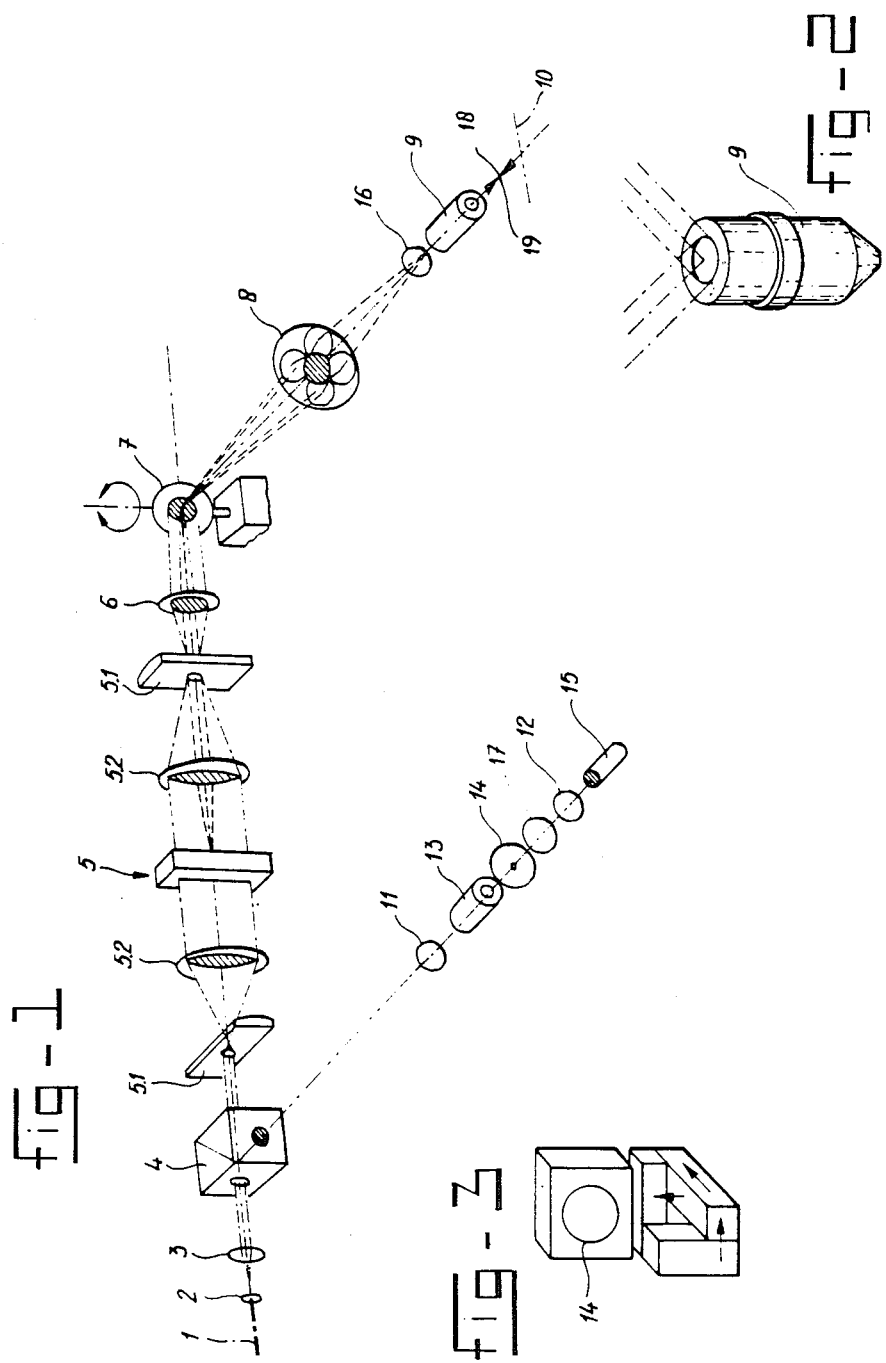

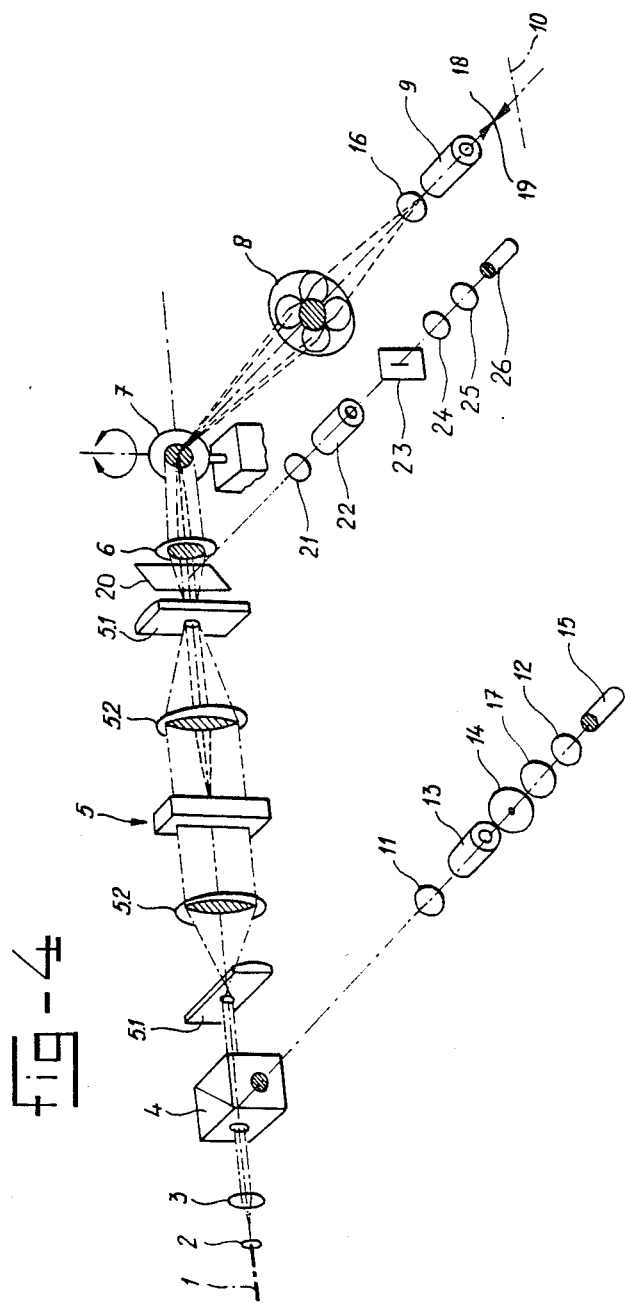

CONFOCAL LASER SCANNING MICROSCOPE

The invention relates to a confocal laser scanning microscope provided with a laser as point light source, a deflection system for the line and frame scanning and a lens system, at least one objective near the object, an object stage, a spatial filter and a detector, and an electronic control and image-processing system, the object being scanned point by point by the light beam and measurements being made with the detector only where the point light source is focused so that out-of-focus light is not detected, as a result of which resolution and contrast considerably improve in three dimensions, in particular, axially to the image plane, and 3D information can be derived from the object. Such a confocal laser scanning microscope is known from the book entitled "Theory and Practice of Scanning Optical Microscopy" by T Wilson and C Sheppard, Academic Press, 1984.

In such a microscope, the focused laser spot is scanned over the stationary object or preparation. Use is generally made of galvanometric deflection by means of mirror galvanometers in said scanning movement of the focused laser spot both for the line scanning and for the frame scanning. The object is also often scanned by means of the moving object stage with respect to a stationary focus laser spot. The disadvantage of such methods of scanning is that they have a mechanical nature and are therefore inherently slow. This also produces long frame times.

The object of the invention is to eliminate these problems and, in a confocal laser scanning microscope, to achieve a deflection which can operate with high speed and flexibility, i.e. with variable scanning amplitude and various types of microscopy, and which has an optically relatively simple embodiment. As a result of rapid line and frame scanning, it is then possible, in a very short time, to combine electronically a number of thin image sections to form an image with an increased depth of focus.

In a confocal laser scanning microscope of the type mentioned in the introduction, this is thus achieved according to the invention in that, for the more rapid line scanning, the deflection system comprises an acousto-optical deflector and, for the slower field scanning, it comprises another deflector constructed in a manner such that at least the frame-scanning movement of the return light beam is completely eliminated, as a result of which the return light is focussed on the spatial filter.

The use of an acousto-optical deflector is known per se in the case of non-confocal laser scanning microscopy. If it is used in confocal microscopy however, the known disadvantages of the dispersive nature and the necessity of using several lenses then occur, as a result of which, respectively, confocal microscopy using light to be observed of a wavelength other than that of the light incident on the object (fluorescence etc) is not readily possible and the disturbing effect of reflections at surfaces of the lenses used is considerable. In addition, the latter have to be of good quality to avoid aberrations.

In an advantageous embodiment, the other deflector in the deflection system may consist of a mirror galvanometer.

A further advantageous embodiment, in which a beam splitter is incorporated in the light path in order to split off the return light beam after the acousto-optical deflector and to direct it to the detector via a further objective, is characterized in that the deflection system with the acousto-optical deflector is also constructed in a manner such that the line-scanning movement of the return light beam is also completely eliminated, and in that the spatial filter is a pin-hole filter which forms a point detector with the subsequent detector.

Advantageously, in the confocal laser scanning microscope according to the invention a quarter-wave plate may be incorporated in the outward path in front of the objective in order to suppress the disturbing effect of optical reflections in the outward path which are produced by the use of the acousto-optical deflector with the necessity, associated therewith, of using several lenses. A polarizing filter, whose polarization direction is perpendicular to the polarization direction of the outward light should then be incorporated in the path of the reflected light beam. The outward linearly polarized light is converted into circularly polarized light by the quarter-wave plate. After reflection by the object, said circularly polarized light again passes through the quarter-wave plate so that light is linearly polarized with a polarization direction perpendicular to that of the incident beam. The polarization filter incorporated in the path of the reflected light transmits only light having a polarization direction perpendicular to that of the outward beam, and this can then be detected by the point detector.

The invention will now be explained in more detail on the basis of an exemplary embodiment with reference to the drawings, in which:

FIG. 1 gives a diagrammatic view of a first embodiment of the confocal laser scanning microscope according to the invention;

FIG. 2 gives a diagrammatic view of the manner in which the light beam is incident on the objective;

FIG. 3 gives a detailed view of the spatial filter in the microscope of FIG. 1; and FIG. 4 gives a diagrammatic view of a second embodiment of the confocal laser scanning microscope according to the invention.

The first embodiment is explained with reference to FIG. 1. The laser light beam 1 first passes the lenses 2 and 3 forming together a beam expansion optical system, followed by a beam splitter 4, an acousto-optical deflector 5 having a planocylindrical lens 5.1 and a planoconvex lens 5.2 both at the entrance and at the exit side, a lens 6, a deflector 7, which may be a mirror galvanometer deflector, a lens 8, a quarter-wave plate 16, and an objective 9. In the object plane 10, an object, not shown, is further placed on a stationary object stage. The reflected light traverses a return path identical to the outward path up to the beam splitter 4 after which it is split off to a polarizing filter 11, a further objective 13, a spatial filter 14, a lens 17, a band pass or cut-off filter 12, and finally a detector 15.

The expansion optical system mentioned, which has an expansion factor of three, ensures, in combination with the other optical elements, that the light completely fills the entrance pupil of the objective 9. The beam splitter 4 ensures that light reflected by the object is separated from the outward laser light. The acousto-optical deflector 5 brings about the line scanning over the object, and the mirror galvanometer 7 brings about the relatively slower frame scanning across the object. In this connection, the acousto-optical deflector can achieve a deflection of the laser beam with such a high frequency that the latter takes place with video speed or even higher speed.

The lens 6 increases the angle through which the laser beam is deflected by the acousto-optical deflector. The focused spot of the laser beam ends up in a position such that the objective is used in the correct manner. The mirror galvanometer 7 is at the focal point of said lens and is colinear with lens 8 and objective 9. As a result of this, the laser beam is stationary both at the mirror galvanometer and at the rear side of the objective so that, at these positions, only the angle of incidence, but not the position of incidence, of the laser beam changes. In this connection, see FIG. 2 for comparison.

The objective 9 focuses the outward laser beam 18 on the object, which may be, for example, a biological preparation or any other object. The laser light 19 reflected or scattered by the object follows the same optical path backwards up to the beam splitter 4. After this, the reflected light follows the path already specified through the elements 11, 13, 14, 17 and 12 up to the detector 15. The scanning X-Y movement of the laser beam introduced by the acousto-optical deflector and the mirror galvanometer is eliminated again on the return path so that the reflected light is focused on the stationary spatial filter 14, which is a pin-hole filter (2-micron hole). This filter, with the detector immediately behind it, forms a point detector. As a result of this the microscope has confocal characteristics.

In this first embodiment according to the invention, the disturbing reflections introduced in the outward path by the acousto-optical deflector are eliminated by means of a quarter-wave plate 16 incorporated in front of the objective 9 and a polarizing filter 11 incorporated after the beam splitter. The outward linearly polarized light is converted into circularly polarized light by the plate 16, after which said light, after reflection, again passes through said quarter-wave plate and is converted again into linearly polarized light with a polarization direction perpendicular to the incident beam. The polarization filter 11 incorporated after the beam splitter is also adjusted to this polarization direction so that only reflections from the object and the objective 9 are detected.

Further disadvantageous effects may possibly be caused by the dispersive nature of the acousto-optical deflector, as a result of which return light of a wavelength other than the laser light (for example, light emitted by the object through fluorescence) no longer passes through the spatial filter, are taken care of by displacing the spatial filter 14 in those cases. Such a spatial filter may advantageously be displaced by three piezoelectric crystals, each for one of the three axes of the XYZ coordinate system, as indicated in FIG. 3.

Advantageously, such a microscope can be used for examining fluorescent preparations which have this property inherently or have been marked for the purpose. The light emitted as a result when light is incident on the object has a wavelength other than that of the outward laser light. By using a band filter or cut-off filter 12 in the return path which is matched to the expected wavelength of the return light, the latter can be selectively transmitted so that no disturbing effect is experienced from the reflected laser light. Since the light of differing wavelengths also undergoes a different deflection in the acousto-optical deflector 5, the spatial filter 12 must be arranged in another position corresponding to the angular dispersion of the acousto-optical deflector.

FIG. 4 indicates a second embodiment. A dichromatic mirror 20 has been incorporated in the light path between the planocylindrical lens 5.1 and the lens 6. Said mirror transmits the (short-wave) laser light and deflects the long-wave return light originating, for example, from fluorescence. This light is passed through a correction lens 21 and focused with the objective 22 on a special spatial filter 23 which is a slit filter (330 microns × 1 micron), as a result of which this system has confocal characteristics. In this manner, a line detector is formed with the subsequent lens 24 and detector 26. Between the lens 24 and the detector 26 one more band pass or cut-off filter 25 has been incorporated which has the same function as that of the band pass or cut-off filter 12. With this embodiment, return light which has a wavelength other than that of the outward light can be advantageously examined if the acousto-optical deflector has too low an efficiency for said light, i.e. brings about too large an attenuation.

With this microscope it is possible to assemble, for example, 20 images per second at a line frequency of 20 kHz. That is to say, each image contains 1000 lines. With such a number of 20,000 lines per second and if there are to be 1000 image points or pixels per line, the detector and the subsequent electronics which measure the half tone of a pixel which have to have at least a response of not more than 50 nsec. Advantageously, with such a fast image assembly, an image with increased depth of focus can be built up by combining a number of thin image sections. According to the above example, 20 sections situated underneath each other can be combined in one second so that an object which is 20 sections thick can be reproduced with complete sharpness.

In addition to being used in the field of application of biology, such a microscope according to the invention having a line-scanning frequency of, for example, 20–30 kHz and a frame-scanning frequency of, for example, 90 Hz can also be used in forensic examination and in the microelectronics industry. In all cases, the fact that it is not necessary with this microscope to work with the object under vacuum is of great advantage. In contrast to the scanning electron microscope, for which the preparations have to be covered with a thin conductive metal layer, this method is also non-destructive. The fact that, in the microscope according to the invention, no mechanical forces are exerted on the preparation is also an advantage over systems in which the preparation is scanned. In the microelectronics industry, this microscope can be used for production control of LSI and VLSI chips, the production of "custom design" chips and also the functional control of chips by means of the so-called "optical beam induced current" method.

The present microscope can also be used advantageously for examining optical memories.

We claim:

1. A confocal laser scanning microscope for viewing an object and producing a magnified image of the object comprising a plurality of lines arranged in a frame, said microscope comprising:
   a laser light beam source emitting a light beam;
   deflection means to deflect the light beam along lines, and for deflecting the line-deflected light beam into successive line positions in the frame;

at least one objective in the path of the deflected light beam and between the deflection means and the object, and located near the object;

an object stage for holding the object;

diversion means for diverting, away from the laser light beam, the light beam reflected from the object;

a spatial filter in the path of the diverted light beam for spatially filtering the diverted light beam, thereby permitting substantially only in-focus light reflected from the object to pass beyond the spatial filter;

and a detector in the path of the spatially-filtered diverted light beam;

wherein said deflection means comprises an acousto-optical deflector for deflecting the light beam along the lines, and a second deflector for deflecting the line-deflected light beam into successive line positions in the frame, whereby resolution and contrast considerably improve in three dimensions, in particular, axially to the image plane, and three-dimensional information can be derived from the object.

2. A confocal laser scanning microscope according to claim 1, wherein said second deflector is a mirror galvanometer.

3. A confocal laser scanning microscope according to claim 1, wherein the diversion means is a beam splitter; wherein the spatial filter is a pinhole filter; and wherein the position of the diversion means along the light beam is between the laser light beam source and the deflection means whereby both the line-scanning movement and the frame-scanning movement of the return light beam are eliminated.

4. A confocal laser scanning microscope according to claim 3, further comprising:

a quarter-wave plate located in the light beam between the deflection means and the at least one objective, said quarter-wave plate converting the light from the laser light beam source into circularly polarized light, and said quarter-wave plate also converting the circularly polarized light reflecting from said object into linearly polarized light having a polarization direction perpendicular to that of the light from the laser light beam source; and a polarizing filter located in the diverted light beam between the diversion means and the spatial filter, the polarizing filter oriented so that its direction of polarization is perpendicular to the polarization direction of the light from the laser light beam source, thereby transmitting substantially only light reflected by the object and blocking substantially all light reflected elsewhere along the light beam.

5. A confocal laser scanning microscope according to claim 4, wherein the deflection means deflects light at an angle which varies as a function of its wavelength, and further comprising:

displacement means for displacing said spatial filter in three dimensions, said displacement means displacing said spatial filter so as to transmit substantially only diverted light deflected at a particular angle other than the angle through which light from the laser light beam source is deflected, whereby light reflected or emitted by the object that is of a particular wavelength other than that of the light from the laser light beam source is transmitted; and wavelength filter means located along the path of the diverted light to filter out diverted light of the same wavelength as that of the light from the laser light beam source.

6. A confocal laser scanning microscope according to claim 1, further comprising:

dichromatic reflection means located in the light beam between the said acousto-optic deflector and the said second deflector, for transmitting light of the wavelength of the light from the laser light beam source and for reflecting light which has another wavelength;

a line detector in the reflected light path; and an objective in the reflected light path between said dichromatic reflection means and said line detector.

7. A confocal laser scanning microscope according to claim 6, wherein said line detector comprises a spatial slit filter and a second detector.

8. In a confocal laser scanning microscope for viewing an object and producing a magnified image of the object comprising a plurality of lines arranged in a frame, said microscope comprising:

a laser light beam source emitting a light beam;

deflection means to deflect the light beam along lines, and for deflecting the line-deflected light beam into successive line positions in the frame;

at least one objective in the path of the deflected light beam and between the deflection means and the object, and located near the object;

an object stage for holding the object;

diversion means for diverting, away from the laser light beam source, the light beam reflected from the object;

a spatial filter in the path of the diverted light beam for spatially filtering the diverted light beam, thereby permitting substantially only in-focus light reflected from the object to pass beyond the spatial filter, whereby the resolution and contrast considerably improve in three dimensions, in particular, axially to the image plane, and three-dimensional information can be derived from the object;

and a detector in the path of the spatially-filtered diverted light beam;

the improvement wherein:

said deflection means comprises an acousto-optic deflector for deflecting the light beam along the lines, and a second deflector for deflecting the line-deflected light beam into successive line positions in the frame, whereby the frame-scanning movement of the return light beam is eliminated, as a result of which the return light beam is focused on the spatial filter.

9. A confocal laser scanning microscope according to claim 8, wherein said second deflector is a mirror galvanometer.

10. A confocal laser scanning microscope according to claim 8, wherein the diversion means is a beam splitter; wherein the spatial filter is a pinhole filter; and wherein the position of the diversion means along the light beam is between the laser light beam source and the deflection means whereby both the line-scanning movement and the frame-scanning movement of the return light beam are eliminated.

11. A confocal laser scanning microscope according to claim 10, further comprising:

a quarter-wave plate located in the light beam between the deflection means and the at least one objective, said quarter-wave plate converting the light from the laser light beam source into circularly polarized light, and said quarter-wave plate also converting the circularly polarized light reflecting from said object into linearly polarized light having a polarization direction perpendicular to that of the light from the laser light beam source; and a polarizing filter located in the diverted light beam between the diversion means and the spatial filter, the polarizing filter oriented so that its direction of polarization is perpendicular to the polarization direction of the light from the laser light beam source, thereby, transmitting substantially only light reflected by the object and blocking substantially all light reflected elsewhere along the light beam.

12. A confocal laser scanning microscope according to claim 11, wherein the deflection means deflects light at an angle which varies as a function of its wavelength, and further comprising:

displacement means for displacing said spatial filter in three dimensions, said displacement means displacing said spatial filter so as to transmit substantially only diverted light deflected at a particular angle other than the angle through which light from the laser light beam source is deflected, whereby light reflected or emitted by the object that is of a particular wavelength other than that of the light from the laser light beam source is transmitted; and wavelength filter means located along the path of the diverted light to filter out diverted light of the same wavelength as that of the light from the laser light beam source.

13. A confocal laser scanning microscope according to claim 8, further comprising:

dichromatic reflection means located in the light beam between the said acousto-optic deflector and the said second deflector, for transmitting light of the wavelength of the light from the laser light beam source and for reflecting light which has another wavelength;

a line detector in the reflected light path; and an objective in the reflected light path between said dichromatic reflection means and said line detector.

14. A confocal laser scanning microscope according to claim 13, wherein:

said line detector comprises a slit filter and a second detector.

* * * * *